United States Patent [19]
Seki et al.

[11] Patent Number: 5,365,305
[45] Date of Patent: Nov. 15, 1994

[54] POWER SUPPLY CONTROL CIRCUIT FOR A DISPLAY OF A CAMERA

[75] Inventors: Yoichi Seki; Hiroyuki Saito, both of Chiba, Japan

[73] Assignee: Seikosha Co., Ltd., Tokyo, Japan

[21] Appl. No.: 23,011

[22] Filed: Feb. 25, 1993

[30] Foreign Application Priority Data

Mar. 17, 1992 [JP] Japan .................................. 4-060524

[51] Int. Cl.$^5$ ................................................ G03B 7/26
[52] U.S. Cl. .................................................. 354/484
[58] Field of Search ......................................... 354/484

[56] References Cited

U.S. PATENT DOCUMENTS

| 4,645,326 | 2/1987 | Kiuchi et al. | 354/484 |
| 4,855,781 | 8/1989 | Hoshino | 354/484 |
| 4,914,469 | 4/1990 | Ishimura et al. | 354/484 |
| 5,032,864 | 7/1991 | Ishimura et al. | 354/484 |
| 5,136,327 | 8/1992 | Ogawa | 354/484 |

Primary Examiner—Russell E. Adams
Attorney, Agent, or Firm—Jordan and Hamburg

[57] ABSTRACT

In a power supply control circuit for a display of a camera, when an operation signal is input, a control circuit determines that an operation mode exists and activates a boosting circuit and a voltage dividing circuit. The control circuit activates a power supply switching circuit to switch the power supply for a display unit driving circuit to the output of the voltage dividing circuit. In response to the input operation signal, the control circuit executes such processes as photographing, film rewinding and/or film loading by the operation of the rear lid switch, etc. Upon completion of the operation, the control circuit sets the mode to a waiting mode, and monitors the detection output of a battery voltage detecting circuit. If the voltage of the battery exceeds a predetermined voltage stored in the ROM in the control circuit, the control circuit determines that the battery voltage has been restored, and applies a power supply switching signal to a power supply switching circuit, so that the power supply for the display unit driving circuit is switched to the battery and the boosting circuit and the converting circuit are both deactivated 7 Claims, 6 Drawing Sheets

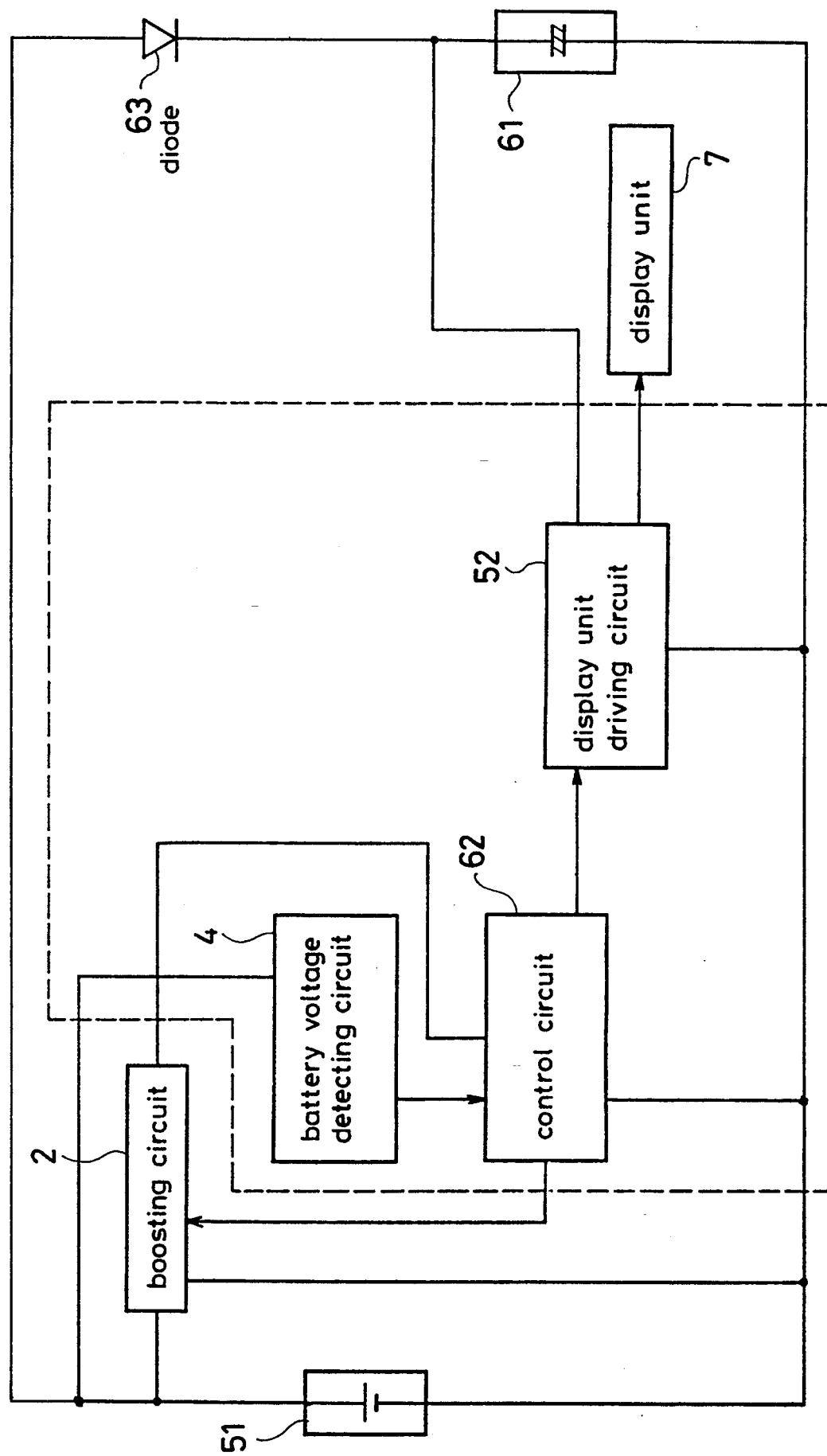

POWER SUPPLY CONTROL CIRCUIT FOR A DISPLAY OF A CAMERA

FIELD OF THE INVENTION

This invention relates to an arrangement for supplying power to the display of a camera.

BACKGROUND OF THE INVENTION

In a camera, when a flash is activated or when the film is wound up or rewound, the battery voltage drops markedly. Therefore, it is impossible to use the battery for driving the camera directly as a power supply for displaying a date on a liquid crystal display unit, for example. Accordingly, in the prior art camera, as shown in FIG. 5, a separate power supply battery 53 is provided for activating a display unit driving circuit 52, in addition to the camera driving power supply 51. Alternatively, as shown in FIG. 6, a capacitor 61 of large capacitance is connected across the battery power source for the display unit driving circuit 52, in order that the display unit driving circuit 52 is not subjected to the harmful influence of a drop in the battery voltage caused when the camera is operated under a large load.

In the prior art methods, however, since the separate battery for the display unit driving circuit, or the capacitor, is large in size, a large space is inevitably required. In particular when an to connect the battery and the display unit driving circuit, a considerable space is needed. In addition, there exists the problem that the cost of the camera is increased.

SUMMARY OF THE INVENTION

An object of the present invention is to provide a power supply control circuit for a display of a camera that is low in cost and small in space.

BRIEF DESCRIPTION OF THE DRAWINGS

An embodiment of the present invention will be described hereinbelow with reference to the attached drawings, wherein:

FIG. 6 is a block diagram showing another prior art display power supply circuit for a camera.

DESCRIPTION OF THE PREFERRED EMBODIMENTS

Figure 1:
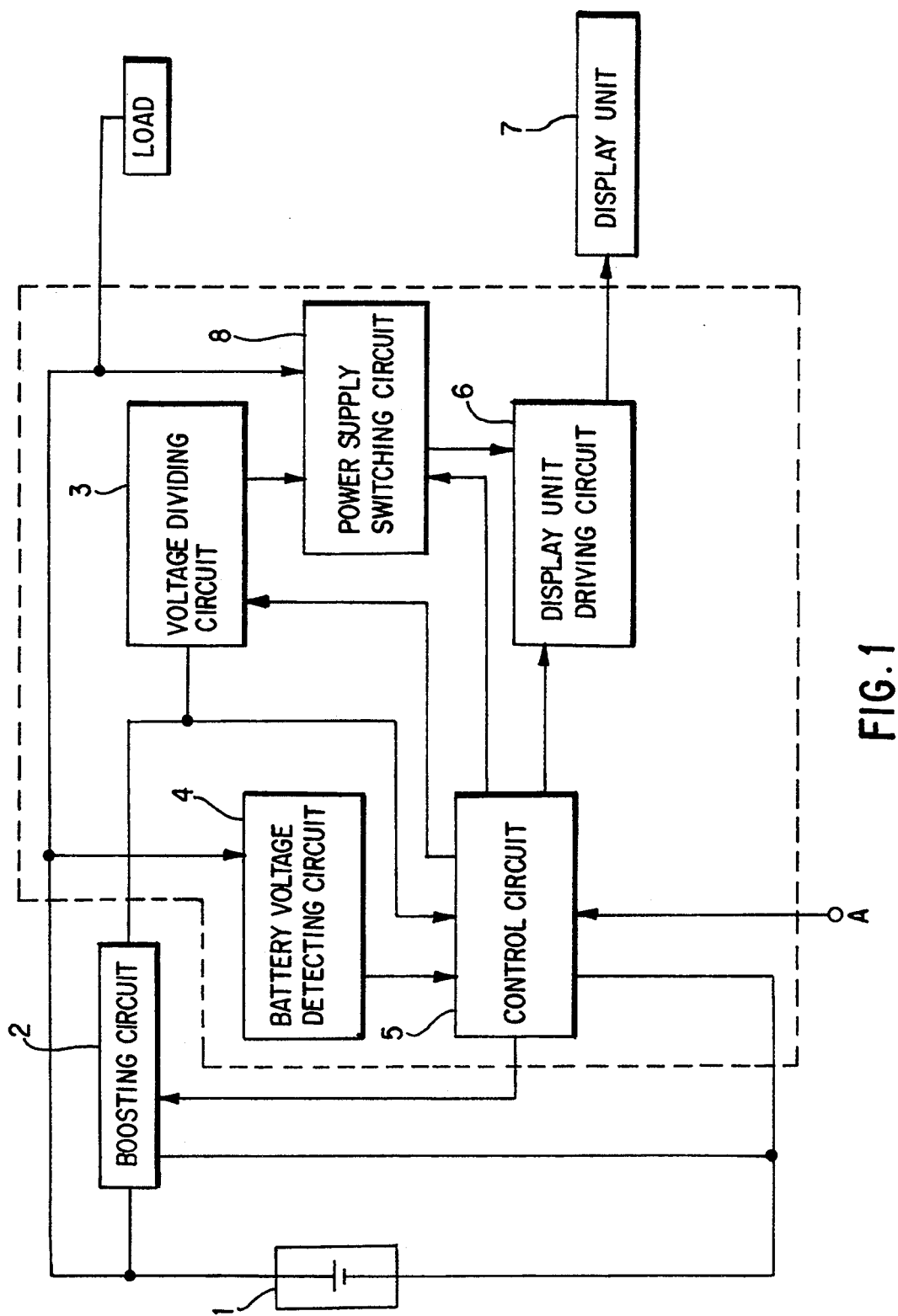
FIG. 1 is a block diagram showing one embodiment of the invention.

In the drawing, reference numeral 1 denotes a battery used as a power supply for the camera, and reference numeral 2 denotes a boosting circuit of the chopper type comprised of a DC/DC convertor, to boost the voltage of the battery 1. Reference numeral 3 denotes a voltage dividing circuit for dividing the voltage boosted by the boosting circuit 2, and reference numeral 4 denotes a battery voltage detecting circuit for detecting the battery voltage. Reference numeral 5 denotes a control circuit comprised of a CPU, a ROM, a RAM, etc. The control circuit 5 determines the existence of a waiting mode or an operation mode in response to a signal input via a terminal A, and further controls various operations of the camera.

Reference numeral 6 denotes a display unit driving circuit for a display unit 7 in accordance with drive control signals generated by the control circuit 5.

The display unit 7 in this embodiment is comprised of a liquid crystal display panel to always display various photographic information data (e.g. the number of film frames, the necessity of stroboscope flash, etc.) and other data (e.g. the date, the time, etc.)

Reference numeral 8 denotes a power supply switching circuit for switching the power supply for the display unit driving circuit in response to the control signals generated by the control circuit 5.

Voltage dividing circuit 3, battery voltage detecting circuit 4, control circuit 5, display unit driving circuit 6 and power supply switching circuit 8 are fabricated on one chip in this embodiment.

Conventional sections are not directly related to the operation of the present invention, such as an oscillation circuit for generating a clock signal for the control circuit 5, for instance are not shown in FIG. 1.

The operation of the embodiment shown in FIG. 1 will be described hereinbelow with reference to FIG. 2.

In this embodiment, the mode in which only the display unit 7 is activated by the display unit driving circuit 6 is referred to as the waiting mode, and the mode in which a high load is applied to the battery, such as when the film is being wound or rewound or the flash is used, is referred to as the operation mode.

The assumption is made that the power supply switching circuit 8 outputs the voltage of battery 1 and neither the boosting circuit 2 nor the voltage dividing circuit 3 are activated in the waiting mode.

Under these conditions, since the boosting circuit 2 is not activated, the voltage of the battery 1 is not boosted, so that the battery voltage is output as it is from the boosting circuit 2 without being boosted. Therefore, the control circuit 5 is operated using the battery voltage as a power supply, and outputs a drive control signal for the display unit driving circuit 6.

Since the power supply switching circuit 8 outputs the voltage of the battery 1, the display unit driving circuit 6 is operated by the power supply of the battery 1 and therefore the display unit 7 is driven in response to the drive control signal.

When the user depresses a shutter switch (not illustrated) or a film winding switch (not illustrated), an operation signal is input to the terminal A.

In response to this signal input via the terminal A, the control circuit 5 determines that the waiting mode has changed to the operation mode, and activates both the boosting circuit 2 and the voltage dividing circuit 3 (in steps 2a and 2b). The control circuit 5 then generates a power supply switching signal for application to the power supply switching circuit 8 to switch the power supply input of the display unit driving circuit 6 to the output of the voltage dividing circuit 3 (in step 2c).

Thereafter, in response to the operation signal input through the terminal A, the control circuit 5 executes various operations such as photographing film rewinding, film loading caused by the depression of a rear lid switch, etc. (in steps 2d to 2i). During these operations, since the display unit driving circuit 6 is supplied with a voltage stabilized by the voltage dividing circuit 3 and since the control circuit 5 is supplied with a voltage sufficiently high and stable from the boosting circuit 2, neither the display unit driving circuit 6 nor the control circuit 5 are subjected to the influence of a drop of battery voltage due to the application of a large load to the battery during the above-mentioned operations.

Upon completion of the above-mentioned operations (in steps 2d to 2j), the control circuit 5 monitors the output of the battery voltage detecting circuit 4 (in step 2j). At this time, since the load applied to the battery 1 is only the load of the boosting circuit 2, the voltage of the battery is gradually restored.

Therefore, when the voltage of the battery 1 rises above a predetermined voltage stored in the ROM of the control circuit 5, the control circuit 5 determines that the voltage of the battery 1 is restored (in step 2j), and generates a power supply switching signal for application to the power supply switching circuit 8, so that the power supply for the display unit driving circuit 6 is now switched to the battery 1 (in step 2k).

Thereafter, the control circuit 5 deactivates the boosting circuit 2 and the voltage dividing circuit 3 (in steps 2m and 2n), thus ending the operation.

In the above-mentioned embodiment, the power supply of the display unit driving circuit 6 is switched to the battery 1 when the voltage of the battery 1 is restored to be above the predetermined voltage, after the end of the operation mode.

Another embodiment will be described hereinbelow with reference to FIG. 3, such that the mode is compulsorily set to the waiting mode when the voltage of the battery 1 has not been restored after a predetermined time has elapsed.

Figure 3:
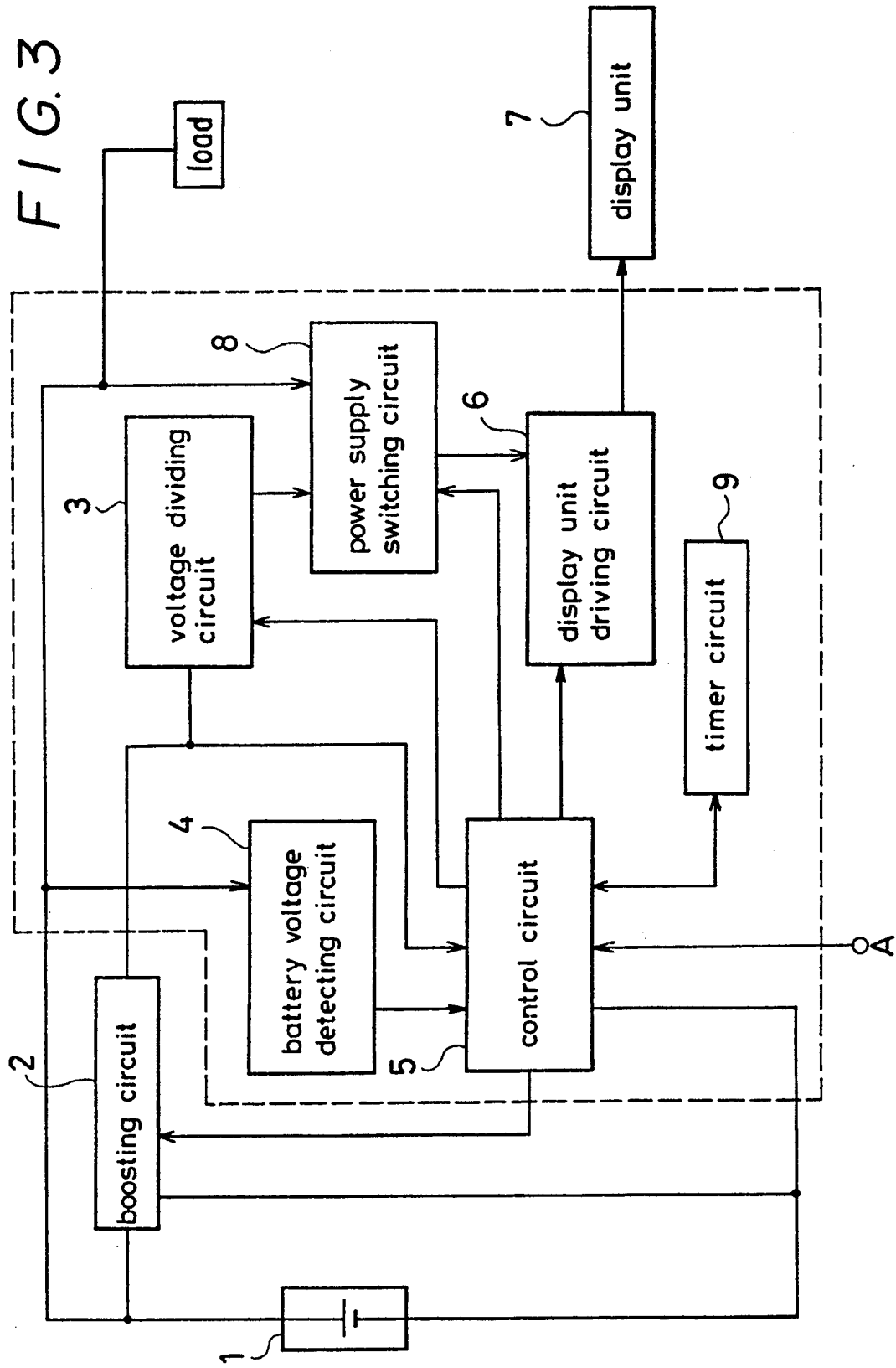
FIG. 3 is a block diagram showing another embodiment of the invention.

In FIG. 3, the reference numeral 9 denotes a timer circuit.

The reference numeral 10 denotes a control circuit comprised of a CPU, a ROM, a RAM, etc. The control circuit 10 determines the existence of the waiting mode or the operation mode in response to the operation signal input via the terminal A, and further controls various operations.

In FIG. 3, the parts or elements which are the same as those in FIG. 1 are identified by the same reference numerals.

Figure 4:
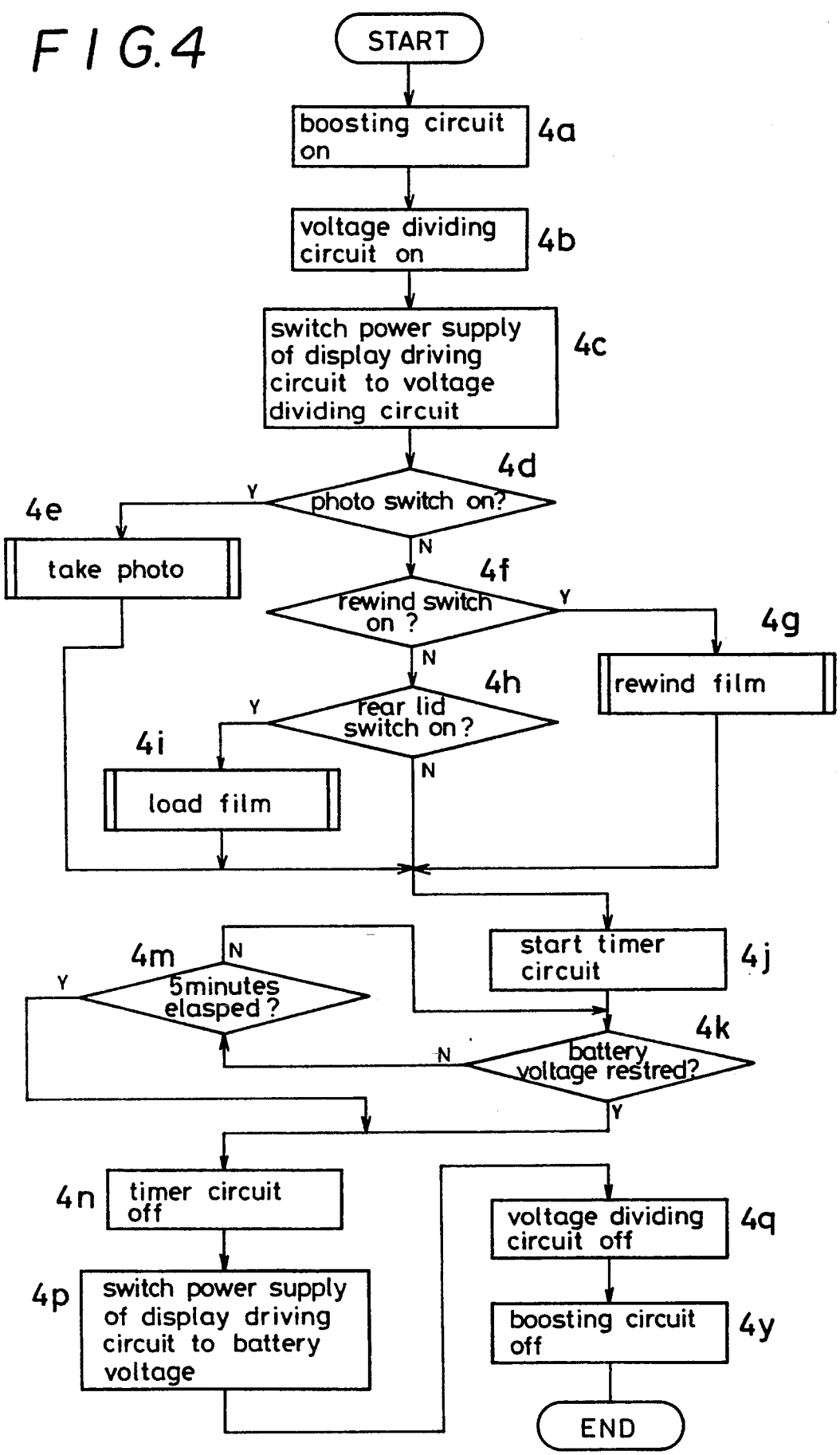
FIG. 4 is a flowchart for explaining the operation of the embodiment shown in FIG. 3.
Figure 5:
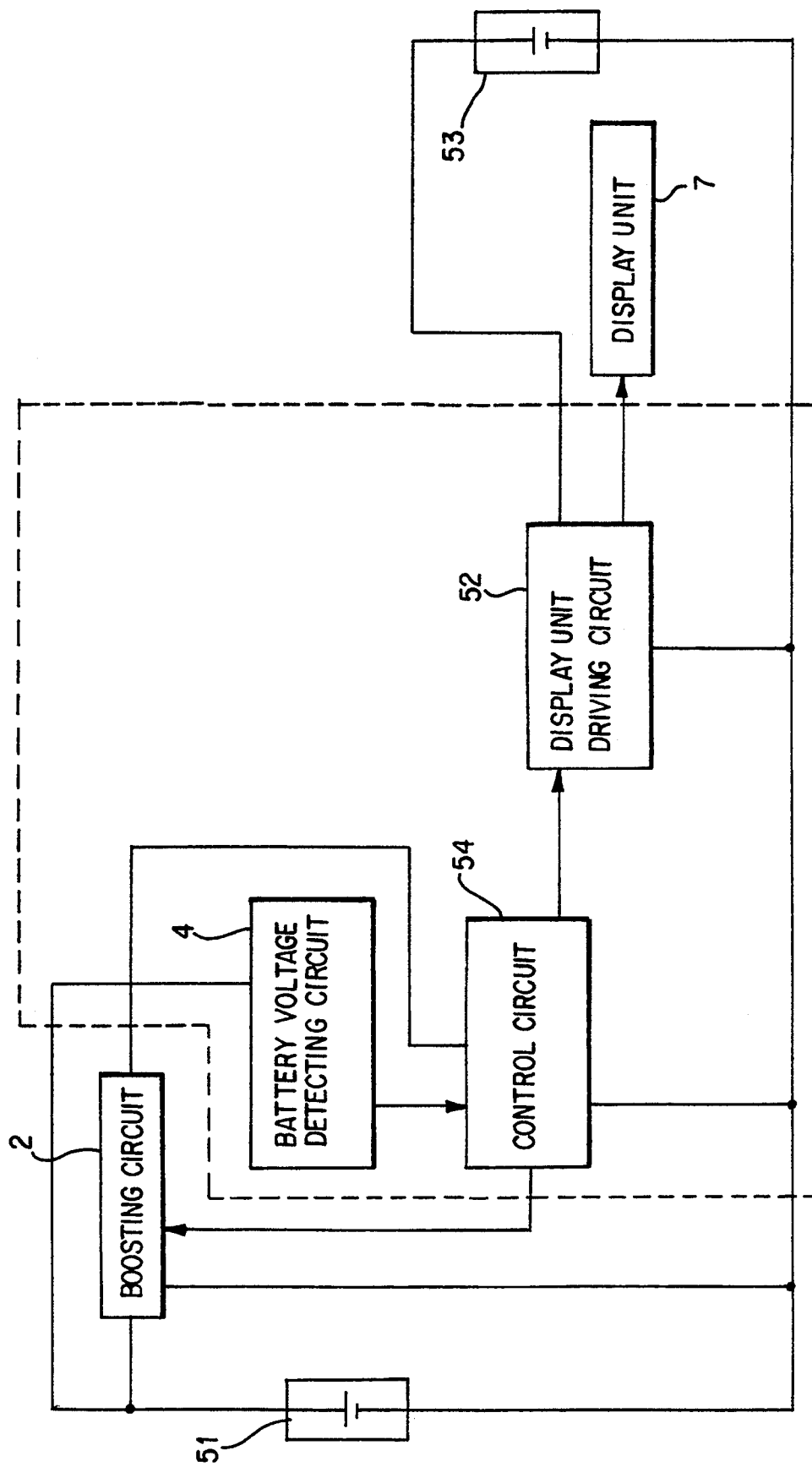
FIG. 5 is a block diagram showing a prior art display power supply circuit for a camera.

The operation of the embodiment of FIG. 3 will be described hereinbelow with reference to FIG. 4.

Figure 2:
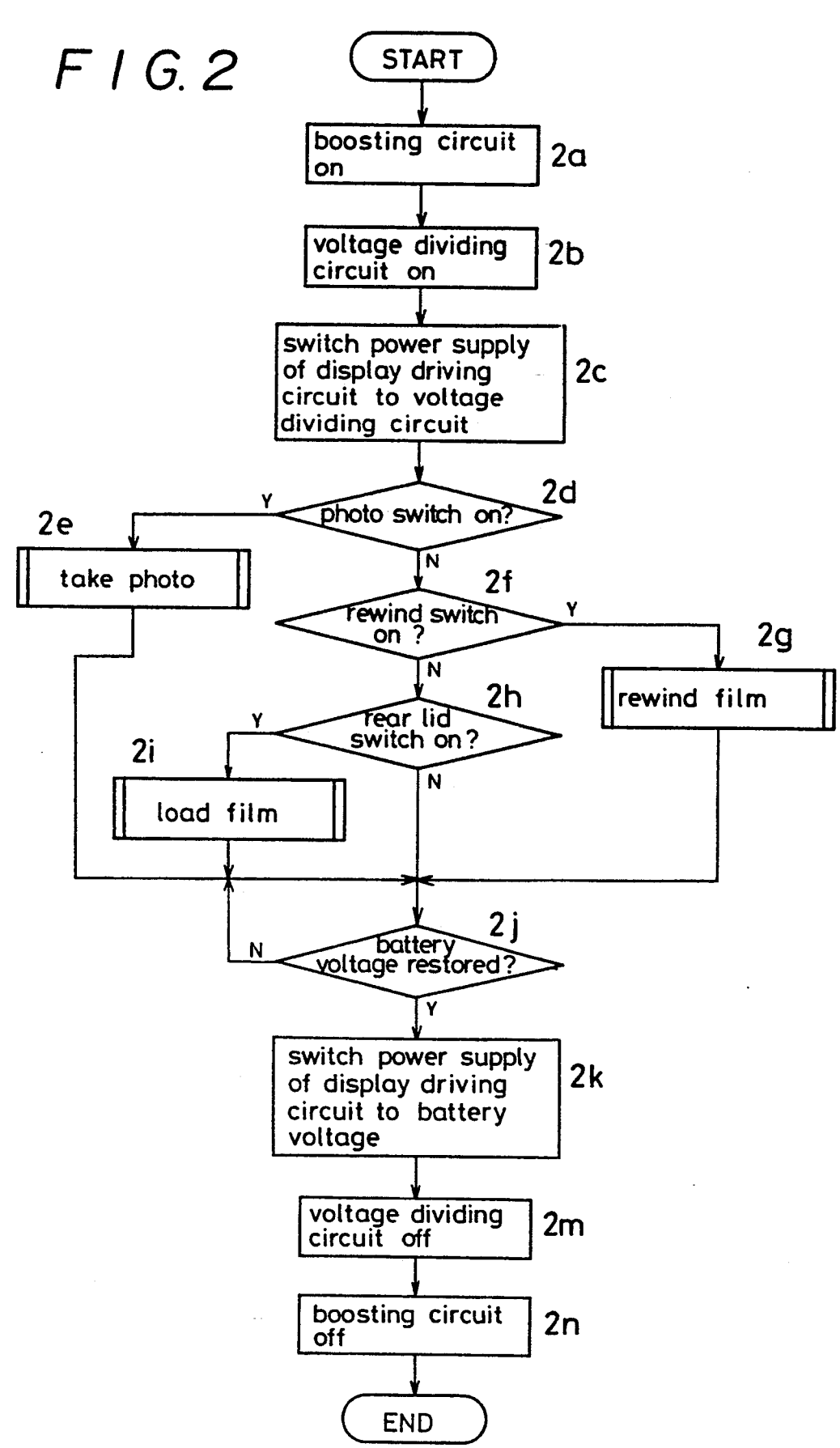
FIG. 2 is a flowchart for explaining the operation of the embodiment shown in FIG. 1.

Upon completion of the operation mode in the same way as in the embodiment of FIGS. 1 and 2, the control circuit 10 activates the timer circuit 9 (in step 4j).

The control circuit 10 then monitors the output signal of the battery voltage detecting circuit 4 to determine if the voltage of the battery 1 is restored (in step 4k).

If the voltage of the battery 1 is not restored, the control circuit 10 next determines if the value counted by the timer circuit 9 exceeds a predetermined time (e.g. about 5 minutes) stored in the ROM of the control circuit 10 (in step 4m). If the predetermined time is not yet counted, the operation of step 4k is repeated.

If the value counted by the timer circuit 9 exceeds the predetermined value during the operation of step 4m, the control circuit 10 deactivates the timer circuit 9 (in step 4n), and applies a power supply switching signal to the power supply switching circuit 8, so that the power supply for the display unit driving circuit 6 is switched to the battery 1 (in step 4p).

In other words, even if the voltage of the battery 1 is not restored to the predetermined voltage when the predetermined time has elapsed, the power supply for the display unit driving circuit 6 is compulsorily switched to the battery 1.

Thereafter, the same operations as described above with reference to FIG. 2 are executed.

In this embodiment, it is possible to prevent the boosting circuit from being kept activated after the operation mode has been returned to the waiting mode, thus preventing the wasteful consumption of the battery.

In the above-mentioned embodiments, although a liquid crystal display panel is used as the display unit, it is of course possible to use any kind of display units such as 7-segment LEDs.

The load applied to the battery changes in response to the type (e.g. film winding or loading processing) of the operation signals input via the terminal A. If the operation signal applied to the control circuit via the terminal A causes such a low load that the voltage drop of the battery will not exert a harmful influence upon the driving operation of the display unit driving circuit 6, however, it is possible to switch the power supply for the display unit driving circuit 6 to the battery 1 immediately after the operation mode ends, without waiting for restoration of the battery voltage.

It is also possible to set the mode to be the waiting mode as soon as the above-mentioned low load is activated, in addition to the case wherein the display unit 7 is activated by the display unit driving circuit 6. In this case, when the low load is activated, the power supply for the display unit driving circuit 6 is the battery.

It is also possible to prestore data corresponding to the predetermined voltage used as the restoration reference of the battery voltage and the preset time of the timer circuit 9 in an EEPROM of the control circuit 10.

According to the present invention, in the operation mode when a load greater than a predetermined value is applied to the battery, the display means is activated by the boosting means. Upon the completion of the operation mode, however, since the power supply for the display means is switched to the battery by the power supply switching means, it is possible to operate the display means stably and additionally to reduce the cost and the space or size of the circuit, without need for a separate additional battery for the display unit driving circuit, or a capacitor of large capacitance.

Upon the completion of the operation mode, since the power supply for the display means is switched to the battery in response to the detection output signal of the battery voltage detecting means, the display unit can be activated stably only after the battery voltage is restored.

If the battery voltage is not restored when a predetermined time has elapsed after the end of the operation mode, since the power supply for the display means is switched to the battery, it is possible to increase the life time of the battery in addition to improving the above-mentioned effects.

Although the present invention has been fully described by way of example with reference to the accompanying drawings, it is to be understood that various changes and modifications will be apparent to those skilled in the art. Therefore, unless such changes and modifications depart from the scope of the invention, they should be construed as being included therein.

What is claimed is:

1. A power supply control circuit for a display of a camera energized by a battery, comprising:

display means for displaying photographic information data or a date;

boosting means for boosting the voltage of the battery to a predetermined voltage;

control means for determining the existence of a waiting mode in which a load beyond a predetermined value is not applied to the battery and an operation mode in which a load beyond the predetermined value is applied to the battery;

battery voltage detecting means for detecting the voltage of the battery; and power supply switching means for switching a power input of said display means to said boosting means during said operation mode and for switching said power input to the battery when said battery voltage detecting means detects restoration of the battery voltage after the end of said operation mode, according to an output signal of said control means.

2. A power supply control circuit for a display of a camera energized by a battery, comprising:

display means for displaying photographic information data or a date;

boosting means for boosting the voltage of the battery to a predetermined voltage;

control means for determining the existence of a waiting mode in which a load beyond a predetermined value is not applied to the battery and an operation mode in which a load beyond the predetermined value is applied to the battery;

battery voltage detecting means for detecting the voltage of the battery;

a timer circuit connected to start a time counting operation after an end of said operation mode; and power supply switching means for switching a power input for said display means to said boosting means during said operation mode and for switching said power input to the battery when said battery voltage detecting means does not detect restoration of the battery until the timer circuit counts a predetermined time after the end of said operation mode.

3. A power supply control circuit for a camera having a display, a load, signal input means for receiving an operation signal representative of energization of said load, and a battery connected to energize said load, the improvement wherein said power supply control circuit comprises:

voltage stabilizing means having a power input coupled to said battery and a stabilized voltage output;

switching means connected to selectively energize said display from said battery and said output of said voltage stabilizing circuit;

voltage detecting means for detecting the voltage of said battery; and control means comprising means for controlling said switching means to energize said display with said stabilized voltage output in response to the receipt by said signal input means of said operation signal and means responsive to cessation of said operation signal for controlling said switching means to energize said display with said battery in response to detection by said voltage detecting means of a battery voltage exceeding a predetermined voltage.

4. The power supply control circuit of claim 3, wherein said voltage stabilizing means comprises a voltage boosting circuit connected to receive the output voltage of said battery, and a voltage dividing circuit connected to receive the output of said voltage boosting circuit, to produce said stabilized voltage output.

5. The power supply control circuit of claim 3, wherein said control means further comprises means connected to control said switching means to energize said display from said battery a predetermined time following said cessation of said operation signal, independently of the output of said voltage detecting means.

6. A method for controlling the energization of a display of a camera having a display, a load, signal input means for receiving an operation signal representative of energization of said load, a battery connected to energize said load, and a source of stabilized voltage energized by said battery, said method comprising:

energizing said display from said voltage stabilizing source in response to said operation signal at said signal input means;

detecting the voltage of said battery; and energizing said display from said battery upon a cessation of said operation signal at said signal input means, in response to detection of a battery voltage exceeding a predetermined voltage.

7. The method of claim 6 further comprising energizing said display from said battery upon the lapse of a predetermined time following a cessation of said operation signal at said signal input means, independently of said step of detecting the voltage of said battery.

* * * * *